US005759441A

United States Patent [19]

Tokuoka et al.

[11] Patent Number: 5,759,441

[45] Date of Patent: Jun. 2, 1998

[54] HALOGEN SCAVENGERS

[75] Inventors: Yoshikazu Tokuoka; Haruo Shibatani, both of Tokyo, Japan

[73] Assignee: S. T. Chemical Co., Ltd., Tokyo, Japan

[21] Appl. No.: 589,322

[22] Filed: Jan. 22, 1996

Related U.S. Application Data

[63] Continuation of Ser. No. 251,634, May 31, 1994, Pat. No. 5,503,768, which is a continuation of Ser. No. 894,611, Jun. 5, 1992, abandoned.

[30] Foreign Application Priority Data

| | | | |
|---|---|---|---|
| Jun. 6, 1991 | [JP] | Japan | 3-160901 |
| Mar. 16, 1992 | [JP] | Japan | 4-89291 |

[51] Int. Cl.[6] .......... C11D 3/395; C11D 3/34; C09K 3/00

[52] U.S. Cl. .......... 252/186.37; 252/186.35; 252/186.36; 252/187.1; 252/187.2; 252/187.24; 252/187.25; 252/187.26; 252/187.32; 510/302; 510/363

[58] Field of Search .......... 252/186.35, 186.37, 252/186.36, 187.2, 187.21, 189, 187.32, 187.26, 187.34, 187.1, 187.25; 510/302, 363

[56] References Cited

U.S. PATENT DOCUMENTS

| | | | |
|---|---|---|---|
| 3,791,977 | 2/1974 | Ancel et al. | 252/156 |
| 4,115,058 | 9/1978 | Blumbergs et al. | 8/111 |
| 4,279,764 | 7/1981 | Brubaker | 252/99 |
| 4,330,425 | 5/1982 | Boden et al. | 252/187 H |
| 4,696,774 | 9/1987 | Teleschow | 260/543 R |

FOREIGN PATENT DOCUMENTS

| | | |
|---|---|---|
| 43-2103 | 1/1968 | Japan . |
| 51-39967 | 10/1976 | Japan . |

*Primary Examiner*—Sharon A. Gibson
*Assistant Examiner*—Deanna Baxam
*Attorney, Agent, or Firm*—Oblon, Spivak, McClelland, Maier & Neustadt, P.C.

[57] ABSTRACT

A halogen scavenger contains as an effective ingredient an aromatic compound which has a resonance-effect-relying electron donating group as a substituent. The aromatic compound is constituted, for example, by an aromatic ring such as a substituted or unsubstituted benzene, naphthalene, anthracene and pyridine ring, and at least one group (a resonance-effect-relying electron donating group) which contains a lone-pair-containing hetero atom, such as an oxygen, sulfur or nitrogen atom, adjacent to the aromatic ring.

2 Claims, 1 Drawing Sheet

HALOGEN SCAVENGERS

This is a continuation of application Ser. No. 08/251,634 filed on May 31, 1994, now allowed as U.S. Pat. No. 5,503,768, which is a Continuation of application Ser. No. 07/894,611 filed on Jun. 5, 1992, now abandoned.

BACKGROUND OF THE INVENTION

1. Field of the Invention

This invention relates to halogen scavengers, and more specifically to halogen scavengers capable of suppressing the release of halogen gas harmful for the human body.

2. Description of the Related Art

Halogen gas such as chlorine gas, which is released by various chemical reactions, have extremely harmful effects on the human body. There is hence an outstanding demand for the suppression of its release.

Hypochlorites such as sodium hypochlorite, for instance, are used in bleaching agents such as bleaching agents for clothes, bleaching agents for kitchen use, mold removers, toilet cleaners, drain pipe cleaners and disinfecting cleaners. These hypochlorites, however, give off toxic chlorine gas under the action of an acid so that their combined use with an acid cleaner has been extremely dangerous.

In fact, there have been reported several accidents caused by the use of a mold remover and an acid cleaner in combination. Bleaching cleaners containing sodium hypochlorite or the like and acid cleaners containing hydrochloric acid or the like are now required to show the warning note, "Dangerous. Don't mix!".

In the case of acid cleaners containing hydrochloric acid, hydrogen chloride changes to chlorine gas in an oxidative atmosphere. A working compartment with a drafting equipment is therefore provided for the handling of an industrial acid cleaner where release of chlorine gas is expected. It is, however, difficult to take such a measure for the domestic use.

In addition, it has become necessary to adopt an effective means for the removal of halogen so that the air in halogen-handling research or production facilities can be cleaned or resins can be produced with improved properties.

For the purposes described above, there have heretofore been proposed as halogen scavengers sulfamic acid, resorcine, pyrroglutamic acid (Japanese Patent Publication No. 56154/1985), catechins (Japanese Patent Publication No. 18909/1990), boron and iodine compounds (Japanese Patent Publication No. 10178/1990), isocyanuric acid (Japanese Patent Laid-Open No. 58328/1989), tetrathiafulvalene (Japanese Patent Laid-Open No. 171624/1989) and quaternary ammonium salts (Japanese Patent Laid-Open No. 56599/1991).

In addition, scavengers disclosed in patent publications include 2-methyl-2-butene, pinene (Japanese Patent Laid-Open No. 142137/1987) and, as substances capable of binding halogen, phenol, nylon, polyacetylene and tetrathiafulvalene derivatives (Japanese Patent Laid-Open No. 171624/1989).

Almost all these halogen scavengers, however, are intended to capture chlorine present in a solution or that to be released gradually in a solution. For chlorine gas to be released abruptly as in the case of mixing of a chlorine-base bleaching agent with an acid cleaner, absolutely no scavenger has been known yet to promptly capture it before its release into the air except for quaternary ammonium salts.

It is known, on the other hand, that many aromatic compounds form charge transfer complexes together with halogen. Substances capable of forming charge transfer complexes together with halogen, however, have not been studied too much with respect to their effectiveness for the capture or absorption of halogen. Among these substances, only tetrathiafulvalene is regarded to scavenge halogen selectively and effectively (Japanese Patent Laid-Open No. 171624/1989).

SUMMARY OF THE INVENTION

There is, hence, an outstanding desire for the development of products capable of suppressing the release of halogen gas by simply adding it to reagents or chemicals which are considered to rapidly release toxic and harmful halogen gas such as chlorine gas or bromine gas.

With a view toward overcoming the above problems, the present inventors have conducted an extensive investigation. As a result, it has been found that specific aromatic compounds scavenge halogen and effectively suppress the release of halogen gas, leading to the completion of the present invention.

In one aspect of the present invention, there is thus provided a halogen scavenger which contains as an effective ingredient an aromatic compound having as a substituent at least one resonance-effect-relying electron donating group.

In another aspect of this invention, there is also provided an acid cleaner comprising the above halogen scavenger.

In a further aspect of this invention, there is also provided a bleaching agent or mold remover comprising the above halogen scavenger.

The halogen scavengers of the present invention are capable of suppressing the release of halogen gas efficiently, so that it can be used effectively where there is a potential danger of release of halogen gas. Further, when it is added in advance to a product which may be used in such a way that halogen gas could be released, for example, to an acid cleaner, bleaching agents or mold remover, the release of halogen gas, if it should happen, can be prevented, whereby the safety of the products can be secured to prevent any accidents.

DETAILED DESCRIPTION OF THE INVENTION AND PREFERRED EMBODIMENTS

Figure 1:
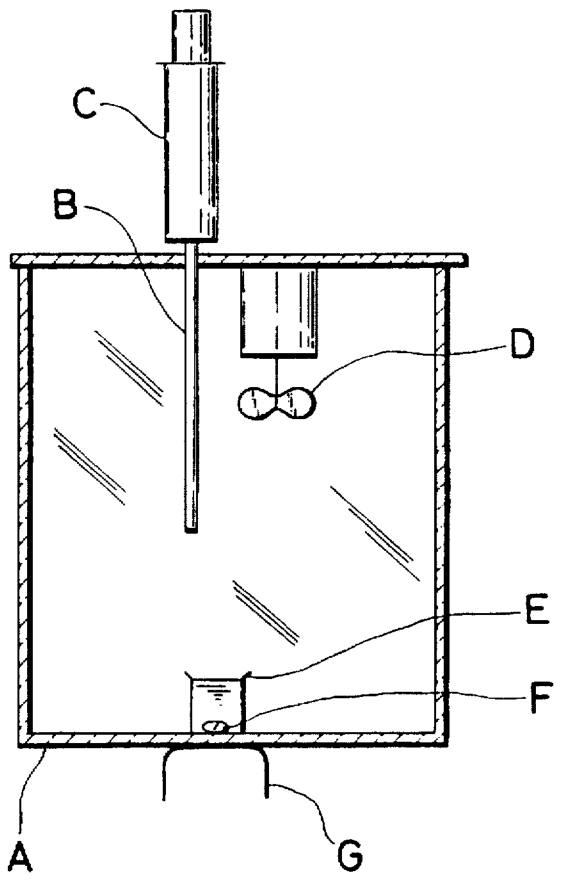
FIG. 1 is a schematic illustration of an apparatus used for the measurement of the concentration of halogen gas.

The aromatic compound having as a substituent a resonance-effect-relying electron donating group (hereinafter called "an electron-donating aromatic compound"), which compound is an effective ingredient of the halogen scavenger of the present invention, is constituted by aromatic ring such as a substituted or unsubstituted benzene, naphthalene, anthracene and pyridine ring, and at least one group (a resonance-effect-relying electron donating group) which contains a lone-pair-containing hetero atom, such as an oxygen, sulfur or nitrogen atom, adjacent to the aromatic ring.

Typical examples of the electron-donating aromatic compound include compounds represented by the following formula (I):

$$R_1—M_1—R_2 \qquad (I)$$

wherein $R_1$ represents an aromatic ring such as a substituted or unsubstituted benzene, naphthalene, anthracene or pyridine ring; $M_1$ represents an oxygen or sulfur atom; and $R_2$ represents an inorganic or organic residual group, such as a hydrogen atom or a substituted or unsubstituted alkyl, aryl, acyl, polyoxyalkylene or nitro group and, also, compounds represented by the following formula (II):

$$R_1—NR_3R_4 \qquad (II)$$

wherein $R_1$ has the same meaning as defined above; $R_3$ and $R_4$ individually represent an inorganic or organic residual group, such as a hydrogen atom or a substituted or unsubstituted alkyl, aryl, acyl, polyoxyalkylene or nitro group.

Specific examples of the above electron-donating aromatic compounds include (1) phenols such as phenol, o-cresol, m-cresol, p-cresol, 3,5-xylenol, carvacrol, thymol, α-naphthol, β-naphthol, catechol, resorcin, hydroquinone, pyrogallol and phloroglucin; (2) alkylene oxide adducts of the above phenols; (3) aromatic amines such as aniline, N-alkylanilines, N,N-dialkylanilines, N-ethylaniline, diphenylamine, 3-methylaniline, chloroanilines, N-nitroaniline, N-alkyl-N-nitroanilines, phenylenediamines, N,N-dichloroethylaniline, N-hydroxyethylaniline and N-methyl-N-hydroxyethylaniline; (4) alkylene oxide adducts of the above aromatic amines; (5) carboxylic acid derivatives of aromatic amine such as formanilide, N-methylformanilide, acetanilide, acetoacetic anilide and chloroacetanilide; (6) phenyl ethers such as phenyl alkyl ethers, alkylphenyl alkyl ethers, diphenyl ether and dialkoxybenzenes; (7) phenol derivatives such as phenoxyacetic acid, phenoxyacetic chloride, alkyl phenoxyacetates, phenoxyacetamide and phenyl alkylcarboxylates; (8) thiophenols such as thiophenol, thiocresols, chlorothiophenols and nitrothiophenols; (9) alkylene oxide adducts of the above thiophenols; (10) aromatic sulfides such as diphenyl sulfide; and (11) sulfonic acid derivatives of all the compounds given in (1)-(10) such as phenolsulfonic acids, anisolesulfonic acids, diphenylether sulfonic acids, dimethoxybenzenesulfonic acids and methoxynaphthalenesulfonic acids, and the sodium salts thereof.

Regarding each of the alkylene oxide adducts out of the above compounds, the corresponding alkylene oxide may be added to one or more of group such as hydroxyl group, amino group or the like where more than one such group are contained. Further, the alkylene oxide adducts may contain an alkyl, aryl, acyl, sulfate, phosphate group or the like at the end of each alkylene oxide so added. Examples of compounds include sodium polyoxyethylene phenyl ether sulfate and sodium polyoxyethylene alkyl phenyl ether sulfate, each having been added with 1–30 moles of ethylene oxide per mole of the corresponding phenols.

In this invention, it is considered that the electron-donating aromatic compound and halogen molecules form a charge transfer complex or form a halogen compound via the charge transfer complex, thereby suppressing the release of halogen gas. From the economical viewpoint, the electron-donating aromatic compound preferably has a lower molecular weight.

One preferred example of these halogen scavengers is an alkylene oxide adduct of a phenol. The compound (hereinafter called "AO-added phenol") obtained by adding an alkylene oxide to such a phenol can be prepared by adding 1–30 moles of an alkylene oxide such as ethylene oxide, propylene oxide or butylene oxide to 1 mole of a phenol such as phenol, o-, m- or p-cresol, 3,5-xylenol, carvachlor, thymol, α- or β-naphthol, catechol, resorcin, hydroquinone, pyrogallol or phloroglucine, preferably in the presence of an acid or alkaline catalyst, while maintaining the reactants in a molten state under heat.

Typical AO-added phenols can be represented by the following formula (III):

$$R_1—O—(AO)_n—X \qquad (III)$$

wherein $R_1$ represents a substituted or unsubstituted phenyl or naphthyl group; A represents a $C_{2-4}$ alkylene group; and X represents a hydrogen atom, an alkyl, aryl or acyl group, a $—SO_3M_2$ group, $M_2$ being a hydrogen atom, an alkali metal or an alkaline earth metal, or $PO(OM_2)_p$, p standing for an integer of 0–2 and $M_2$ having the same meaning as defined above; and n stands for an integer of 1–30.

Specific preferred examples of the AO-added phenols include polyoxyethylene phenyl ether, polyoxyethylene alkyl phenyl ethers and polyoxyethylene polystyryl phenyl ether, and sulfate or phosphate ester salts thereof, each having been added with 1–30 moles of ethylene oxide per mole of the corresponding phenols.

In this invention, it is considered that an AO-added phenol and halogen molecules form a charge transfer complex or form halogen compound via the charge transfer complex, thereby suppressing the release of halogen gas. An AO-added phenol having a lower molecular weight is therefore preferred from the economical viewpoint. In addition, the AO-added phenol desirably has water-solubility as an acid cleaner, bleaching agent or mold remover composition using a halogen scavenger is generally in the form of an aqueous system. Accordingly, ethylene oxide is preferred as an alkylene oxide and is added desirably in small moles as far as water solubility is not lost.

Among halogen scavengers for use in an aqueous system, particularly preferred examples of such AO-added phenols include the ethylene oxide adducts of phenol and alkyl($C_{1-9}$) phenols, each having been added with 3–20 moles of ethylene oxide per mole of the phenol; and the sulfate ester salts of the ethylene oxide adducts of phenol and alkyl($C_{1-9}$) phenols, each having been added with 1–10 moles of ethylene oxide per mole of the phenol.

The halogen scavengers according to the present invention can each be formulated by adding, to one of the above electron-donating aromatic compound, optional components such as a surfactant and a perfume as needed.

The amount of the electron-donating aromatic compound, which is an effective ingredient of the halogen scavenger, can be adjusted depending on the amount of halogen gas expected to be released. Namely, the electron-donating aromatic compound is considered to react with an equimolar amount of halogen molecules so that, when halogen gas is expected to be released in a large amount, it is necessary to add the halogen scavenger correspondingly so as to increase the amount of the electron-donating aromatic compound.

The halogen scavengers of the present invention can be added or otherwise incorporated in advance in products which are expected to release halogen gas, such as acid cleaners, bleaching agents and mold removers.

Acid cleaners containing a halogen scavenger of the present invention can each be formulated by adding —to a traditional acid cleaners component, such as hydrochloric acid, sulfuric acid, phosphoric acid, oxalic acid, lactic acid, citric acid, acetic acid, glycolic acid, malic acid, succinic acid, gluconic acid and tartaric acid—the electron-donating aromatic compound described above together with optional components such as a surfactant and a perfume and, if necessary, a solvent such as ethanol.

It is desirable to add the electron-donating aromatic compound to the acid cleaner in a molar amount equal to or a little larger than an amount of halogen estimated to be released at the time of its mixture, for instance, with a bleaching agent containing a hypochlorite as a main component. When complete suppression of the release of halogen gas is not required, it can of course be added in a smaller amount.

To formulate a bleaching agent or mold remover by using the halogen scavenger of the present invention, it is only necessary to add the electron-donating aromatic compound to an oxidizing agent as a main component of the agent, such as hypochlorous acid, chlorous acid, hypobromous acid, bromous acid or chlorinated isocyanuric acid or a salt thereof, and a surfactant and a perfume as its optional components.

The bleaching agent or mold remover can be provided in various forms depending on the oxidizing agent employed as the main component and also on how they are to be used. If a relatively short storage time is sufficient, a bleaching agent or mold remover can be marketed with all the components mixed in advance. Although hypochlorites, chlorites, bromites and the like per se are relatively stable, they may somewhat interact with the electron-donating aromatic compound. It is, therefore, necessary to select an electron-donating aromatic compound having a suitable resistance to such interaction.

When a hypobromite is employed as an oxidizing agent or when storability over a long period is required where even the oxidizing agent described above is employed, it is preferable to formulate the bleaching agent or mold remover in the mixing-at-need form that two or more chemicals must be mixed just before use to form the target oxidizing agent.

To form a hypobromite at need, it is desirable, for example, to separately prepare a first pack containing a bromide and a second pack containing a hypochlorite and then to mix them together at need, thereby promptly forming the hypobromite.

Examples of the hypochlorite usable in the above method include sodium hypochlorite and potassium hypochlorite, while those of the bromide include sodium bromide and potassium bromide.

The first and second packs preferably contain these two components in amounts sufficient to yield a desired amount of the hypobromite in the composition to be provided after the contents of these packs are combined.

The halogen scavenger may be added in any one or both of the first and second packs when the bleaching agent or mold remover is formulated in the form of a mixing-at-need type. It is, however, preferable from the viewpoint of the storage stability to add the scavenger to the first pack. It may be added within a range of the above-described amount relative to the composition to be provided after the contents of the two packs are combined.

When a solid chlorine-containing oxidizing agent such as chlorinated isocyanuric acid or calcium hypochlorite is employed as an oxidizing agent, it is possible to package the oxidizing agent together with or separately from the electron-donating aromatic compound and then to add them in water just before use. An alkaline agent such as sodium metasilicate can also be added as needed. In this case, the three components may be mixed in advance, or they may be packaged separately in two or three packs. Moreover, a bromide such as sodium bromide can also be added to any of these components. Furthermore, one, two or three of the electron-donating aromatic compound, alkaline agent and bromide may be dissolved in water in advance, and the solid chlorine-containing compound and any remaining component(s) may be added to the resulting solution just before use. In these cases, the above mixtures may be packaged in single-use portions with a water-soluble film.

If the halogen scavenger of the present invention is employed in applications, other than their use as domestic bleaching cleaners or acid cleaners, for example, for scavenging halogen in a reaction mixture in industrial equipment, cleaning the air in research or production facilities or promoting the reaction or controlling side reactions in organic synthesis, it is possible not only to charge the scavenger directly in the liquid but also to allow it to be carried on an inorganic porous carrier, cloth or paper.

As shown in examples to be described later, the effects of the present invention are considered attributable to the formation of a charge transfer complex between the electron-donating aromatic compound and released halogen molecules or to the formation of a halogen compound via the charge transfer complexes, thereby suppressing the release of halogen gas.

The present invention will next be described in detail by the following examples. It should however be borne in mind that this invention is by no means limited to or by the examples. The measurement of halogen gas in each example was conducted, in principle, in accordance with the following method. (Measurement of the amount of released halogen gas)

The amount of released halogen gas was measured using a 20-l apparatus as shown in FIG. 1. Placed in a beaker designated at E inside a measuring box A were 3 ml of an acidic solution (such as hydrochloric acid) or an oxidizing agent (such as an aqueous solution of sodium hypochlorite, an aqueous solution of sodium hypobromite or an aqueous solution of chlorinated isocyanuric acid or the like), followed by the addition of 3 ml of the oxidizing agent (when the acidic solution was placed beforehand) or the acidic solution (when the oxidizing agent was placed beforehand). After a lid being put on the beaker immediately, the contents were stirred by using a magnetic stirrer G and a stirred bead F. The air was circulated downwardly by a fan D in a box. Five minutes later, gas was drawn by a gas sampler C equipped with a detector tube B, whereby the concentration of halogen gas in the box was measured. Incidentally, a halogen scavenger, when used, was added to either the acid solution or the oxidizing agent.

EXAMPLE 1

Using a 1:2.5 by volume mixed solvent of water and ethanol, 10 ml of a 10% HCl solution were prepared. An electron-donating aromatic compound was added to the above solution to provide a sample. The amount of the electron-donating aromatic compound added was equimolar to chlorine molecules ($6.75\times10^{-3}$ mol) to be produced upon mixing 10 ml of the HCl solution with 10 ml of a 5% aqueous solution of sodium hypochlorite (hereinafter referred to as "5% sodium hypochlorite).

3 ml of the sample were sampled, in which 3 ml of 5% sodium hypochlorite were then mixed. The amount of chlorine gas released was quantitatively measured. The results are shown in Table 1.

TABLE 1

| Electron-donating aromatic compound | Amount of chlorine released, ppm |
|---|---|
| Aniline | 0 |
| Anisole | 1.8 |
| Acetanilide | 3.5 |
| Thiophenol | 0 |
| p-Cresol | 1 |

TABLE 1-continued

| Electron-donating aromatic compound | Amount of chlorine released, ppm |
|---|---|
| p-Nitrophenol | 2.7 |
| m-Nitrophenol | 9 |
| p-Chlorophenol | 1 |
| Phenol | 0.5 |
| Not added (control) | 800 |

EXAMPLE 2

Ten milliliters of 10% HCl aqueous solution were prepared, to which an electron-donating aromatic compound was added in an amount equimolar to chlorine molecules ($6.75\times10^{-3}$ mol) to be released upon addition of 10 ml of 5% sodium hypochlorite to the above HCl solution. The resulting solution was provided as a sample.

A 3-ml portion of the sample was sampled, in which 3 ml of 5% sodium hypochlorite were then mixed. The amount of chlorine gas released was quantitatively measured.

The relationships between the compounds added and the corresponding amounts of chlorine gas released are as shown in Table 2.

TABLE 2

| Electron-donating aromatic compound | Amount of chlorine released, ppm |
|---|---|
| POE (5.5) phenyl ether | 0 |
| POE (5.5) naphthyl ether | 0 |
| DiPOE (5.5) bisphenyl ether(1) | 0 |
| POE (4) phenyl ether | 1 |
| N,N-diPOE (5.5) aniline | 0 |
| Formanilide(2) | 2.5 |
| 2-Aminopyridine | 7 |
| Sodium p-phenolsulfonate(2) | 4 |
| Not added (control) | >1000 |

Note 1: POE means the addition of polyoxyethylene. This applies equally hereinafter.
Note 2: Values in parenthesis mean the moles of ethylene oxide added. This applies equally hereinafter.
(1)Ethylene oxide adduct of bis(p-hydroxyphenyl) methane
(2)Data obtained using the compound as a saturated aqueous solution

EXAMPLE 3

Polyoxyethylene (4) phenyl ether, which was in an equimolar amount to chlorine molecules ($4.1\times10^{-3}$ mol) to be produced upon addition of 10 ml of 5% sodium hypochlorite to 10 ml of 3% HCl aqueous solution, was added to 10 ml of 3% HCl aqueous solution. The resulting solution was used as a sample.

A 3-ml portion of the sample was sampled, in which 3 ml of 5% sodium hypochlorite were then mixed. The amount of chlorine gas released was quantitatively measured.

The relationships between the compounds added and the corresponding amounts of chlorine released are as shown in Table 3.

TABLE 3

| Sample | Amount of chlorine released, ppm |
|---|---|
| 3% HCl added with $Cl_2$-scavenger | 1.5 |
| 3% HCl (scavenger-free) | 90 |

EXAMPLE 4

Ten milliliters of a (0.675 mol/l) aqueous solution of sodium hypochlorite were prepared, to which an AO-added phenol was then added in a molar amount 0.5, 1 or 1.5 times chlorine molecules to be released upon addition of 10 ml of 10% HCl to the sodium hypochlorite solution.

Further, 5 ml of a (0.135 mol/l) aqueous solution of sodium bromide were added to 5 ml of a (0.135 mol/l) aqueous solution of sodium hypochlorite, whereby 10 ml of a ($6.75\times10^{-2}$ mol/l) aqueous solution of sodium hypobromite solution were prepared. To the resulting solution, an AO-added phenol was added in an amount 0.5, 1 or 2 times bromine molecules ($3.375\times10^{-4}$ mol/l) to be produced upon addition of 10 ml of 10% HCl to 10 ml of the sodium hypobromite solution.

Sampled were 3-ml portions of these two solutions. The amounts of chlorine gas and bromine gas released upon mixing of these solutions with 3 ml of 10% HCl were quantitatively measured. The results are shown in Table 4.

TABLE 4

| | Number of times of added AO-added phenol | | | | | |
|---|---|---|---|---|---|---|
| | ½ | 1 | 1.5 | ½ | 1 | 2 |
| AO-added phenol | Amount of $Cl_2$ released, ppm | | | Amount of $Br_2$ released, ppm | | |
| POE (5) phenyl ether | 160 | 2 | 0.7 | 23 | 1.0 | 0.2 |
| POE (6.5) methyl phenyl ether | 200 | 1 | 0 | 8.0 | 0 | 0 |
| POE (8.5) t-butyl phenyl ether | 100 | 0.5 | 1 | 23 | 2.0 | 0.6 |
| POE (11) nonyl phenyl ether | — | — | — | 30 | 5.5 | 0.2 |
| POE (24) polystyryl phenyl ether | — | — | — | 22 | 10 | 3.5 |
| POE (1) phenyl ether sulfate sodium salt | — | 0.2 | 0.2 | — | — | — |

EXAMPLE 5

A 2.7% (0.27 mol/l) aqueous solution of sodium bromide containing 10% of an AO-added phenol shown in Table 5 was prepared as a first pack. On the other hand, a 2% (0.27 mol/l) aqueous solution of sodium hypochlorite was prepared as a second pack. Bleaching effects of a bleaching cleaner, which had been obtained by combining the first and second packs, and a $Br_2$ amount released upon addition of 3 ml of the bleaching cleaner to 3 ml of 10% HCl were measured.

(Bleaching Effects)

It is generally known that bleaching power is indicated by an oxidation-reduction potential (Compiled by Japan Research Association for Textile End-Use: "Consumer Science Handbook of Fiber Products—New Edition", p.495, Koseikan). A bleaching cleaner was prepared by mixing 100 ml of the first pack and 100 ml of the second pack. The oxidation-reduction potential of the bleaching cleaner was measured. As a bleaching cleaner for comparison, a 4% (0.54 mol/l) aqueous solution of sodium hypochlorite was used.

(Results)

The oxidation-reduction potential of the bleaching agent obtained by mixing the first pack, which contained 10% POE (11) nonylphenyl ether as an AO-added phenol and 2.7% (0.27 mol/l) of sodium bromide, and the second pack containing 2% (0.27 mol/l) of sodium hypochlorite was 814 mV. The oxidation-reduction potential of the 4% aqueous solution of sodium hypochlorite employed for comparison was 775 mV. As a result, the bleaching agent of the present invention was found to have bleaching power sufficiently comparable to 4% sodium hypochlorite despite its lower concentration.

The relationships between the AO-added phenols contained in the first packs and bromine released (82.7% (0.27 mol/l) sodium bromide; 2% (0.27 mol/l) sodium hypochlorite] are as shown below in Table 5.

TABLE 5

| AO-added phenol | Amount of $Br_2$ released, ppm |
|---|---|
| POE (5) phenyl ether | 0.3 |
| POE (6.5) methyl phenyl ether | 0.1 |
| POE (5.8) t-butyl phenyl ether | 0.1 |
| POE (11) nonyl phenyl ether[1] | 11 |
| POE (24) polystyryl phenyl ether[2] | 26 |
| POE (10) nonylphenyl ether sulfate ester salt[3] | 20 |
| POE (3) nonylphenyl ether phosphate ester salt[4] | 18 |
| (Control) Not added | >125 |

[1]"Nonipol 110", trade name; product of Sanyo Chemical Industry Co., Ltd.
[2]"Penerol SP-24", trade name; product of Matsumoto Yushi Seiyaku Co., Ltd.
[3]"Penerol SN", trade name; product of Matsumoto Yushi Seiyaku Co., Ltd.
[4]"Adekacol CS-141E", trade name; product of Asahi Denka Kogyo Co., Ltd.

EXAMPLE 6

Confirmation of the formation of charge transfer complex:

UV spectra of the following three samples were measured and, then, compared.

(1) A mixed aqueous solution of 1% sodium hypobromite and POE (11) nonylphenyl ether (reference sample: water)

(2) A mixed aqueous solution of the solution (1) and 10% HCl at a volume ratio of 1:1 [reference sample: an aqueous POE (11) nonylphenyl ether solution]

(3) An aqueous $Br_2$ solution (reference sample: water)

As a result, the maximum absorption wavelength of the sample (1) was around 330 nm (corresponding to sodium hypobromite) and 270 nm [corresponding to the benzene ring of POE (11) nonyl phenyl ether], while that of the sample (2) was at 330–360 nm (corresponding to charge transfer complex). The maximum absorption wavelength of the sample (3) was observed to exist around 400 nm (corresponding to $Br_2$).

From these results, the formation of the charge transfer complex was confirmed for the sample (2).

EXAMPLE 7

Application to acid cleaners (Method)

To 10 ml of 10% HCl, an AO-added phenol was added in a molar amount 1.5 times chlorine molecules to be released upon mixing 10 ml of 10% HCl with 10 ml of 5% sodium hypochlorite, whereby a sample was provided. The concentration of chlorine gas released upon addition of 3 ml of 5% sodium hypochlorite to 3 ml of the sample was quantitatively measured. The results are shown in Table 6.

(Result)

TABLE 6

(Result)

| AO-added phenol | Amount of $Cl_2$ released, ppm |
|---|---|
| POE (5.0) phenyl ether | 0.7 |
| POE (6.5) methyl phenyl ether | 0 |
| POE (8.5) t-butyl phenyl ether | 1 |
| Not added | >1000 |

EXAMPLE 8

Test on Detergency of Acid Cleaners:

(Testing Method)

The detergency of each of three acid cleaners obtained by the method in Example 7 and a control sample (10% HCl) was investigated according to the following method.

(1) Preparation of a soil sample

Two solutions were prepared by adding 5 g of ferric chloride to 247.5 ml of ethanol and adding 0.25 g of lanolin to 2.5 ml of chloroform, respectively. They were both mixed together in 250 ml of water to prepare a suspension.

(2) Soiling method

Twenty-four semi-porcelain tiles (10 cm×10 cm) were washed and dried under heat at 120° C. for 1 hour. They were each sprayed with 25 ml of the suspension prepared above and dried under heat at 120° C. for 1 hour. After the repetition of this operation 9 times, they were dried under heat for 14 hours in the 10th operation, whereby soiled tile samples were prepared.

(3) Washing Method and Measurement of Washing Effects

Soiled tile samples were immersed in 250 ml of an acid cleaner for 30 minutes. After pulled out, they were rubbed crosswise 5 times each (10 times in total at a central part) using a Gardner . straight-type washing tester. They were, thereafter, washed with about 1 l of water and air-dried, and their reflectance was then measured using a photoelectric reflectometer. Based on the reflectance, the detergency (W) was determined in accordance with the following equation. The results are shown in Table 7.

$$W = \frac{R_C - R_S}{R_B - R_S} \times 100(\%)$$

$R_C$: Reflectance after the soiled tile sample was washed (%).

$R_S$: Reflectance before the soiled tile sample was washed.

$R_B$: Reflectance of the original tile (%)

TABLE 7

| (4) Results | |
|---|---|
| AO-added phenol | Detergency (%) |
| POE (5.0) phenyl ether | 88 |
| POE (6.5) methyl phenyl ether | 85 |
| POE (8.5) t-butyl phenyl ether | 93 |
| Control sample (10% HCl) | 69 |

As is apparent from the above table, it has been found that the washing effects of each novel acid cleaner is as high as about 90% and is higher than that of 10% HCl.

EXAMPLE 9

Application to acid cleaner:

An acid cleaner having the following composition was prepared.

| (Composition) | |
|---|---|
| Hydrochloric acid | 10% |
| N,N-dipolyoxyethylene aniline | 19% |
| Water | 71% |

Three milliliters of 5% sodium hypochlorite were mixed in 3 ml of the acid cleaner. The chlorine amount released was quantitatively measured as in Example 1. As a result, release of $Cl_2$ gas was not observed.

EXAMPLE 10

Application to chlorine-containing mold removers:

(Method 1)

To 10 ml of a (0.54 mol/l) aqueous solution of sodium hypochlorite or 10 ml of a (0.135 mol/l) aqueous solution of sodium hypobromite, an AO-added phenol was added in a molar amount 1.5 times chlorine or bromine molecules ($Cl_2$:$5.4\times10^{-3}$ mol, $Br_2$: $6.75\times10^{-4}$ mol) to be released, respectively, upon mixing of 10 ml of 10% HCl with 10 ml of the sodium hypochlorite solution (0.54 mol/l) or 10 ml of the sodium hypobromite solution (0.135 mol/l), so that a sample was provided. Three milliliters of 10% HCl were added to 3 ml of the sample. The concentration of $Cl_2$ gas or $Br_2$ gas released at that time was quantitatively measured. The results are shown in Table 8.

TABLE 8

| AO-added phenol | Amount of halogen gas released, ppm NaOCl | NaOBr |
|---|---|---|
| POE (5.0) phenyl ether | 1 | 0.3 |
| POE (6.5) methyl phenyl ether | 0 | 0.2 |
| POE (8.5) t-butyl phenyl ether | 0 | 0.5 |
| Not added | >1000 | >125 |

(Method 2)

The oxidation-reduction potential of a mixed aqueous solution of sodium hypochlorite and an AO-added phenol or that of a mixed aqueous solution of sodium hypobromite and an AO-added phenol, each having been prepared by Method 1, was measured. On a piece of wood on which mold had been grown, 10 ml of the above sample were sprayed and the bleached state after three minutes was observed. As a reference sample, an aqueous 4% solution of sodium hypochlorite was employed. The results are shown in Table 9.

TABLE 9

| AO-added phenol | Oxidation-reduction potential (mV) NaOCl | NaOBr |
|---|---|---|
| POE (5.0) phenyl ether | 699 | 830 |
| POE (6.5) methyl phenyl ether | 727 | 812 |
| POE (8.5) t-butyl phenyl ether | 727 | 835 |
| Not added | 775 | 830 |

It has been found that all of the samples had mold removing effects comparable with those of 4% sodium hypochlorite, the reference sample.

EXAMPLE 11

(Method 1)

The following compositions were prepared using as an oxidizing agent sodium dichloroisocyanurate in lieu of sodium hypochlorite. The amount of chlorine gas released upon addition of 10% HCl to each of the above compositions was quantitatively measured. The measurement was conducted twice, that is, before and after the addition of 10 ml of water to each composition. The results are given in Table 10.

TABLE 10

| Composition | Amount of $Cl_2$ released, ppm: Before addition of water | After addition of water |
|---|---|---|
| (1) | 0 | 0 |
| (2) | 0 | 0 |
| Not added | >1000 | >1000 |

Bleaching agent (1): 0.58 g of sodium dichloroisocyanurate + 2.42 g of POE (5.0) phenyl ether.
Bleaching agent (2): 0.62 g of sodium dichloroisocyanurate + 2.38 g of POE (6.5) methyl phenyl ether.

(Method 2)

The compositions (1) and (2) prepared in accordance with the method 1 were each added with 10 ml of water, and their oxidation-reduction potentials and mold removing effects were investigated by the method of Example 9. The results are shown in Table 11.

TABLE 11

| Composition | Oxidation-reduction potential (mV) |
|---|---|
| (1) | 1074 |
| (2) | 1037 |

All the compositions had mold removing effects equivalent to 4% sodium hypochlorite.

EXAMPLE 12

A mold remover having the following composition was prepared, and its oxidation-reduction potential and the amounts of chlorine gas and bromine gas released upon addition of 10% HCl were quantitatively measured.

| (Composition) | |
|---|---|
| Sodium dichloroisocyanurate | 1.5% |
| Sodium bromide | 1.5% |
| POE (4) phenyl ether | 2% |
| Sodium hydroxide | 1% |
| Water | 94% |

The mold remover prepared above had an oxidation-reduction potential of 720 mV and neither chlorine nor bromine gas was released at all.

We claim:

1. A bleaching agent composition comprising:

a halogen containing oxidizing agent; and an effective amount of a halogen scavenging compound selected from the group consisting of anisolesulfonic acid and salts thereof.

2. The bleaching agent composition of claim 1, wherein said halogen containing oxidizing agent is a member selected from the group consisting of hypochlorous acid, chlorous acid, hypobromous acid, bromous acid, chlorinated isocyanuric acid and salts thereof.

* * * * *